April 9, 1968     A. L. BAKER ETAL     3,377,112
ROLLER BEARING ASSEMBLY

Original Filed July 18, 1960     2 Sheets-Sheet 1

INVENTORS
A. L. BAKER,
W. J. DREXLER,
W. R. KRAUSE &
F. I. ZENER

BY    J. Russell Juten

ATTORNEY

April 9, 1968  A. L. BAKER ETAL  3,377,112
ROLLER BEARING ASSEMBLY
Original Filed July 18, 1960  2 Sheets-Sheet 2

INVENTORS
A. L. BAKER,
W. J. DREXLER,
W. R. KRAUSE &
F. I. ZENER

BY J. Russell Juten

ATTORNEY

United States Patent Office 3,377,112
Patented Apr. 9, 1968

3,377,112
ROLLER BEARING ASSEMBLY
Allister L. Baker, Denville, William R. Krause, Secaucus, and William J. Drexler, Ridgefield, N.J., and Frederick Irving Zener, South Portland, Maine, assignors to Keuffel & Esser Company, Hoboken, N.J., a corporation of New Jersey
Original application July 18, 1960, Ser. No. 43,642, now Patent No. 3,316,644, dated May 2, 1967. Divided and this application Oct. 14, 1965, Ser. No. 529,611
9 Claims. (Cl. 308—6)

ABSTRACT OF THE DISCLOSURE

A bearing structure particularly useful for drafting machines for obtaining axial movement of a sleeve with respect to a rail while permitting rotation of the sleeve, including rollers of disc shape engaging the rail and extending radially therefrom and being mounted in the sleeve by means of a collar having a groove therein which receives a horse shoe shaped spring serving as the axle for the rollers with at least one roller being resiliently mounted to maintain constant engagement and with the rollers spaced apart an angular distance less than 180° to provide for movement of the sleeve in all positions of the sleeve and of the rail.

---

The present invention relates to a bearing structure particularly useful for drafting machines and is a division of application Serial No. 43,642, filed July 18, 1960, resulting in Patent No. 3,316,644 issued May 2, 1967.

Heretofore various types of bearings have been used to obtain telescopic adjustment of a sleeve with respect to a rail; but none have been entirely satisfactory since they did not provide for support of the rail intermediate its ends and did not provide for yieldable forces being applied to the rollers of the bearings to obtain satisfactory service therefrom.

An object of the present invention is to provide a roller assembly and mounting means for supporting a drafting machine on a drawing board to assure accurate rectilinear movement of line guiding elements to facilitate the operation and improve the accuracy of drafting.

A further object is to provide a bearing construction making use of rollers to accurately maintain axial alignment of a sleeve moving along a circular rail.

Other and further objects will be apparent as the description proceeds and upon reference to the accompanying drawings wherein:

FIG. 3 is a detail section taken substantially on line 3—3 of FIGURE 1 showing the roller assembly at one end of the C-shaped sleeve.

FIG. 4 is an axial section as seen from the rear through one end of the C-shaped sleeve and one C-shaped roller assembly and substantially in the plane of the spring pressed roller and taken substantially on line 4—4 of FIGURE 3 showing the cooperation of the roller assembly with the horizontal supporting rail.

Figure 1:
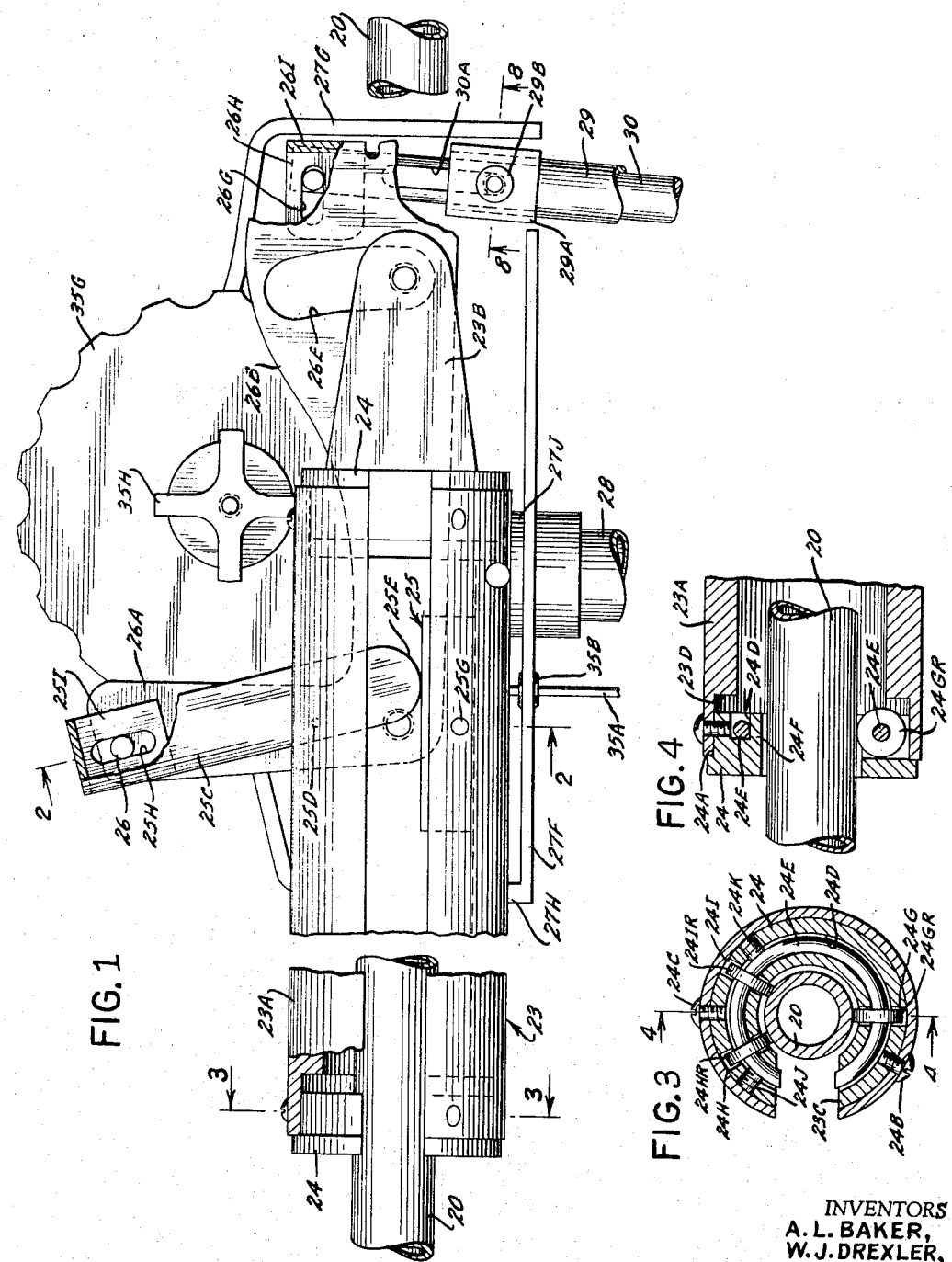
FIG. 1 is a rear view of the horizontally movable first carriage on the same enlarged scale showing the C-shaped sleeve with the roller supporting members at each end engaging the horizontal first rail and showing the horizontal motion lock operating linkage including lever operating mechanism for the lock which provides for clearance of the line guiding means in the plane of the drawing.
Figure 2:
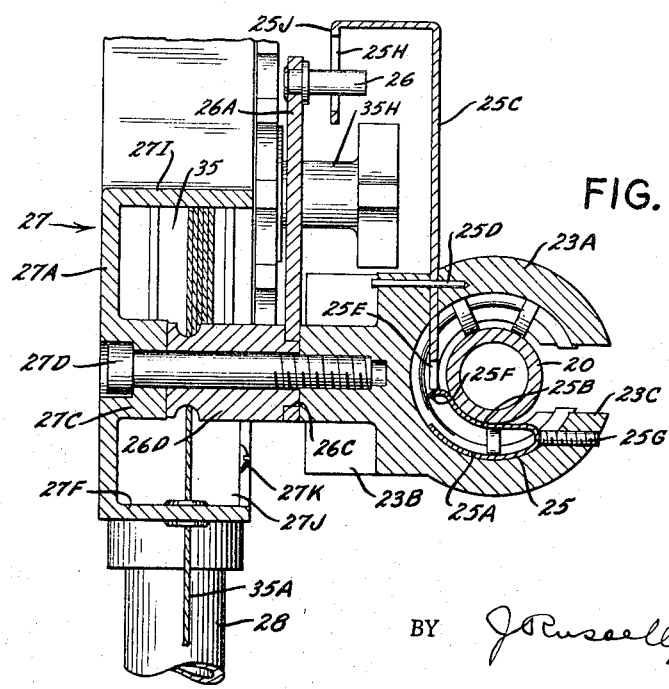
FIG. 2 is a section taken on broken line 2—2 of FIGURE 1 showing the horizontal motion lock and alignment adjusting means.

Briefly the present invention includes a bearing structure for use on the horizontal and vertical rails of a drafting machine and includes a sleeve having ring-like bearing supports with at least three disc-like rollers mounted in the ring-like bearing supports to provide for axial movement of the bearing along a rail to maintain accurate angular relation between carriages mounted on the bearings and the associated rail.

The ends of the tubular sleeve 23A are provided with rabbets 23D which receive roller supporting C-shaped ring-like elements 24 which are also provided with a cooperating rabbet 24A which telescopes into the rabbet 23D and such ring is retained in position by unsymmetrically positioned and different size retaining screws 24B and 24C which pass through openings in the rabbeted end portion of the sleeve 23A and are threaded into tapped openings in the ring 24. The C-shaped ring 24 is provided with a circumferential groove 24D intermediate its inner and outer peripheries which receives a C-shaped spring-like ring 24E which is biased in a direction to tightly grip the inner flange 24F defining the groove 24D. A plurality of radially extending slots 24G, 24H, 24I are provided in the ring 24 and communicate with the circumferential groove 24D and rollers 24GR, 24HR, and 24IR are positioned in such slots and are retained in such slots by the spring ring 24E and such spring ring is retained in position on the ring 24 by Allen head screws 24J, 24K located adjacent the pair of rollers 24HR and 24IR so that the axes of such rollers are maintained in a definite fixed relation at all times while the roller 24G may move radially against the bias of the C-shaped ring spring 24E thereby assuring a uniform pressure contact of the rollers with the horizontal rail 20 and since a roller assembly is provided at each end of the C-shaped sleeve the carriage 23 is accurately guided. It will be evident that the pair of rollers 24HR and 24IR are located along the upper side of the rail 20 when the drafting machine is mounted on a vertically positioned drafting board. Each roller includes an inner race supported on the axle formed by spring ring 24E and an outer race which engages the rail 20 which suitable antifraction bearings between such inner and outer races to assure substantially frictionless movement of the carriage along the rail 20.

It will be evident that the bearing arrangement used on the rail 20 is adaptable for use on the vertical rail of a drafting machine and that the bearing may rotate around the rail 20 when the rail supporting studs are out of the open space of the C-shaped sleeve on which the bearing assemblies are mounted so that a drafting head can be completely removed from a drafting table to provide a clear table top for any use desired.

It will be evident that various changes may be made within the scope of the invention as defined by the valid interpretation of the appended claims.

What is claimed is:

1. A roller assembly for longitudinal and rotatable movement about a shaft comprising a C-shaped body member having a circumferential slot in one side thereof between the inner and outer peripheries, three radial slots communicating with said circumferential groove and formed in said member with the space between any two adjacent slots being appreciably less than 180°, a roller mounted in each slot and having a portion extending inwardly beyond the inner periphery of the C-shaped member, a C-shaped roller retaining axle in said circumferential groove and passing through the axes of said rollers, said rollers being engageable with a rail of circular cross section whereby said roller assembly may move longitudinally and may also rotate relative to said rail, the opening in said C-shaped member providing for the passage of the roller assembly past supporting struts for said rail whereby a rail of extreme indefinite length can be used and provide for straight line movement of said roller assembly along said rail.

2. A carriage comprising a sleeve equipped with a roller assembly according to claim 1 at each end with the openings in the sleeve and in the C-shaped body member in the roller assembly being in substantial registry whereby positive support of the carriage on a rail is provided and angular movement between the axis of the carriage and the axis of the supporting rail is prevented.

3. The invention according to claim 1 in which the rollers are arranged at 60° between two rollers and a third roller is 150° from each of said two rollers, a mounting screw receiving aperture between provided at the midpoint between said two rollers, a mounting aperture being provided 50° in each direction from said mid point, and a fourth mounting aperture being provided 15° from the opening adjacent the opening of the C-shaped member, the third roller being in a plane substantially perpendicular to a plane including the axis of said roller assembly and the direction of the opening in the C-shaped member thereof.

4. A roller assembly for longitudinal and rotatable movement about a rail comprising a member having a circumferential groove in one side thereof between the inner and outer peripheries, at least three radial slots communicating with said circumferential groove and formed in said member with the space between any two adjacent slots being appreciably less than 180 degrees, a roller mounted in each slot and having a portion extending inwardly beyond the inner periphery of the member, a roller retaining axle in said circumferential groove passing through the axes of said rollers, said rollers being engageable with a rail of circular cross section whereby said roller assembly may move longitudinally and may also rotate relative to said rail.

5. The invention according to claim 4 in which the roller retaining axle is of horse shoe shape and of resilient material and is fixedly secured at two points adjacent one end fixing the axes of two of the rollers and the third roller is mounted on the retaining axle adjacent the other end and is yieldably urged toward the rail on which the roller assembly is mounted.

6. A sleeve of appreciable length adapted to encompass a rail and adapted for longitudinal and rotatable movement relative to the rail, a roller assembly mounted adjacent each end of the sleeve, each roller assembly comprising a member having a circumferential groove between the inner and outer peripheries, at least three radial slots communicating with said circumferential groove and formed insaid member with the space between any two adjacent slots being appreciably less than 180 degrees, a roller mounted in each slot and having a portion extending inwardly beyond the inner periphery of the member, a roller retaining axle in said circumferential groove passing through the axes of said rollers, said rollers being adapted for engagement with the rail of circular cross section whereby said sleeve and roller assemblies may move longitudinally and may also rotate relative to said rail.

7. The invention according to claim 6 in which at least one of the rollers is yieldably urged in a direction toward the rail.

8. A roller assembly for longitudinal and rotatable movement about a rail comprising a member for encompassing a rail, circumferential groove in said member between the inner and outer peripheries, at least three radial slots communicating with said circumferential groove and formed in said member with the space between any two adjacent slots being appreciably less than 180 degrees, a roller mounted in each slot and having a portion extending inwardly beyond the inner periphery of the member, a roller retaining axle in said circumferential groove passing through the axes of said rollers, said rollers being engageable with a rail of circular cross setcion whereby said roller assembly may move longitudinally and may also rotate relative to said rail.

9. The invention according to claim 8 in which a ring-like element is positioned in said circumferential groove and the rollers are rotatably mounted on said ring and means are provided to retain said ring in position.

References Cited
UNITED STATES PATENTS

| | | | |
|---|---|---|---|
| 2,627,323 | 2/1953 | Larson. | |
| 2,628,135 | 2/1953 | Magee | 308—6 |
| 2,903,307 | 9/1959 | Peters et al. | 308—6 X |
| 2,983,553 | 5/1961 | Dexter | 308—6 |
| 3,123,108 | 3/1964 | Gaskell et al | 308—6 X |

FOREIGN PATENTS

| | | |
|---|---|---|
| 1,031,490 | 3/1953 | France. |
| 845,675 | 8/1960 | Great Britain. |

CHARLES J. MYHRE, *Primary Examiner.*

ROBERT O. DUA, *Examiner.*